United States Patent
Golov (10) Patent No.: US 11,594,036 B2
(45) Date of Patent: Feb. 28, 2023

(54) ADVANCED DRIVER-ASSISTANCE SYSTEM (ADAS) OPERATION UTILIZING ALGORITHMIC SKYLINE DETECTION

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 22 days.

(21) Appl. No.: 16/546,794

(22) Filed: Aug. 21, 2019

(65) Prior Publication Data

US 2021/0056317 A1 Feb. 25, 2021

(51) Int. Cl.
*G06V 20/56* (2022.01)
*G06T 7/194* (2017.01)
*G06T 7/70* (2017.01)
*G06V 20/13* (2022.01)

(52) U.S. Cl.
CPC ............ *G06V 20/56* (2022.01); *G06T 7/194* (2017.01); *G06T 7/70* (2017.01); *G06V 20/13* (2022.01); *G06T 2207/20132* (2013.01); *G06T 2207/30248* (2013.01)

(58) Field of Classification Search
CPC .. G06K 9/00791; G06K 9/0063; G06T 7/194; G06T 7/70; G06T 2207/20132; G06T 2207/30248
See application file for complete search history.

(56) References Cited

U.S. PATENT DOCUMENTS

| 2,131,042 | A | * | 9/1938 | Halstead | G08G 1/096725 246/174 |
|---|---|---|---|---|---|
| 2,279,151 | A | * | 4/1942 | Wallace | H03J 7/32 334/33 |
| 6,559,933 | B1 | * | 5/2003 | Kirkpatrick | G01P 5/26 356/5.1 |
| 7,860,269 | B2 | * | 12/2010 | Gal | G06V 20/10 356/138 |
| 8,204,329 | B2 | * | 6/2012 | Zhang | G06T 5/008 382/254 |

(Continued)

FOREIGN PATENT DOCUMENTS

EP 2228666 A1 * 9/2010 ............. G01S 5/163

OTHER PUBLICATIONS

Umamaheswari et al "Steering Angle Estimation for Autonomous Vehicle Navigation Using Hough and Euclidean Transform" (Year: 2015).*

(Continued)

*Primary Examiner* — Tsung Yin Tsai
(74) *Attorney, Agent, or Firm* — Greenberg Traurig (57) ABSTRACT

Disclosed are techniques for improving an advanced driver-assistance system (ADAS) by pre-processing image data. In one embodiment, a method is disclosed comprising receiving one or more image frames captured by an image sensor installed on a vehicle; identifying a position of a skyline in the one or more image frames, the position comprising a horizontal position of the skyline; cropping one or more future image frames based on the position of the skyline, the cropping generating cropped images comprising a subset of the corresponding future image frames; and processing the cropped images at an advanced driver-assistance system (ADAS).

14 Claims, 7 Drawing Sheets

(56) References Cited

U.S. PATENT DOCUMENTS

| | | | | |
|---|---|---|---|---|
| 8,577,169 | B2* | 11/2013 | Andrus | H04N 21/4318 |
| | | | | 382/302 |
| 9,165,196 | B2* | 10/2015 | Kesavan | G06V 20/56 |
| 10,275,669 | B2* | 4/2019 | Uliyar | G08G 1/04 |
| 10,282,622 | B2* | 5/2019 | Togashi | G06T 7/248 |
| 10,635,844 | B1* | 4/2020 | Roose | G06F 30/20 |
| 10,713,502 | B2* | 7/2020 | Tiziani | G06V 40/172 |
| 10,755,111 | B2* | 8/2020 | Golov | G06V 20/63 |
| 10,807,592 | B2* | 10/2020 | Golov | G06V 20/582 |
| 10,884,243 | B2* | 1/2021 | Suzuki | B60K 35/00 |
| 11,212,464 | B2* | 12/2021 | Knorr | G06T 7/70 |
| 2001/0021277 | A1* | 9/2001 | Hamamura | G06T 7/70 |
| | | | | 382/289 |
| 2007/0286459 | A1* | 12/2007 | Gal | G06V 20/56 |
| | | | | 382/103 |
| 2010/0195901 | A1* | 8/2010 | Andrus | H04N 5/213 |
| | | | | 382/168 |
| 2014/0139670 | A1* | 5/2014 | Kesavan | B60W 50/0098 |
| | | | | 348/148 |
| 2014/0358433 | A1* | 12/2014 | Padowicz | G01S 5/16 |
| | | | | 701/472 |
| 2016/0277651 | A1* | 9/2016 | Sherman | G06V 20/56 |
| 2017/0337435 | A1* | 11/2017 | Uliyar | G06K 9/6277 |
| 2018/0176483 | A1* | 6/2018 | Knorr | G06T 19/006 |
| 2019/0065859 | A1* | 2/2019 | Togashi | G08B 13/19608 |
| 2019/0230297 | A1* | 7/2019 | Knorr | G06T 7/70 |
| 2019/0266418 | A1* | 8/2019 | Xu | G05D 1/0221 |
| 2019/0294899 | A1* | 9/2019 | Okubo | G06V 20/58 |
| 2020/0012282 | A1* | 1/2020 | Jeon | G06V 10/82 |
| 2020/0050209 | A1* | 2/2020 | Bai | G01C 21/3492 |
| 2020/0133294 | A1* | 4/2020 | Viswanathan | G06V 20/588 |
| 2020/0183157 | A1* | 6/2020 | Suzuki | G02B 27/01 |

OTHER PUBLICATIONS

Zhang et al "A Low Cost Vision-Based Road-Following System for Mobile Robots" (Year: 2018).*

* cited by examiner

ADVANCED DRIVER-ASSISTANCE SYSTEM (ADAS) OPERATION UTILIZING ALGORITHMIC SKYLINE DETECTION

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward autonomous vehicles and, specifically, to systems for improving the operation of an advanced driver-assistance system (ADAS) by eliminating extraneous graphical data processed by such a system.

Currently, many vehicles employ advanced driver-assistance systems. An ADAS is a system that provides feedback or automatically controls a vehicle in response to a defined input. One example of an ADAS is a blind spot detection system. Another example is a system that maintains a safe following distance of a vehicle with respect to other vehicles.

Generally, an ADAS relies on image data captured by one or more cameras installed on the vehicle housing the ADAS. These cameras transmit frames of images to an electronic control unit (ECU) that processes the images and generates output signals appropriate for the type of ADAS. As one example, in a safe following distance ADAS, images taken from the front of the vehicle are captured and sent to an appropriate ECU. In response, the ECU analyzes the images using various image processing techniques to identify whether a vehicle or other object is within a certain distance of the front of the vehicle. The ECU then outputs a signal to a user interface (e.g., dashboard interface) that indicates the results of the processing.

While current systems are capable of detecting objects (e.g., other vehicles) in image frames captured by vehicular cameras, they suffer from multiple deficiencies. In general, the vehicular cameras transmit an entire image frame. However, these frames generally include a significant amount of irrelevant information. In particular, a portion of the images includes the sky which is irrelevant for object detection. By transmitting a full frame, including extraneous portions, current centralized ADAS systems expend additional energy and introduce unnecessary latency in the vehicle network.

Thus, there exists a need to remedy these and other deficiencies of existing ADAS architectures.

SUMMARY

Disclosed herein are methods, computer-readable media, and devices for improving ADASs using image pre-processing techniques.

The disclosed embodiments describe techniques for pre-processing image frames captured by image sensors installed in vehicles. The describe pre-processing comprises identifying a skyline portion of a set of frames captured by the image sensors. In response, future image frames captured by the image sensors are cropped and these cropped frames are then processed by one or more ADAS ECUs. In some embodiments, all processing is performed within the cameras and only cropped image data is sent to the ADAS ECUs. In other embodiments, cameras are equipped only to crop image frames according to a preconfigured horizontal border position. This preconfigured horizontal border position is computed by the ADAS ECUs and is periodically updated to compensate for a changing skyline position.

In one embodiment, a method is disclosed comprising receiving one or more image frames captured by an image sensor installed on a vehicle; identifying a position of a skyline in the one or more image frames, the position comprising a horizontal position of the skyline; cropping one or more future image frames based on the position of the skyline, the cropping generating cropped images comprising a subset of the corresponding future image frames; and processing the cropped images at an advanced driver-assistance system (ADAS).

In another embodiment, a non-transitory computer readable storage medium for tangibly storing computer program instructions capable of being executed by a computer processor is disclosed, the computer program instructions defining the steps receiving one or more image frames captured by an image sensor installed on a vehicle; identifying a position of a skyline in the one or more image frames, the position comprising a horizontal position of the skyline; cropping one or more future image frames based on the position of the skyline, the cropping generating cropped images comprising a subset of the corresponding future image frames; and processing the cropped images at an advanced driver-assistance system (ADAS).

In another embodiment, a device is disclosed comprising a processor and a storage medium for tangibly storing thereon program logic for execution by the processor, the stored program logic causing the processor to perform the operations of: receiving one or more image frames captured by an image sensor installed on a vehicle, identifying a position of a skyline in the one or more image frames, the position comprising a horizontal position of the skyline, cropping one or more future image frames based on the position of the skyline, the cropping generating cropped images comprising a subset of the corresponding future image frames, and processing the cropped images at an advanced driver-assistance system (ADAS).

The embodiments provide numerous advantages over existing ADAS systems. First, the reduce size of cropped images result is less data being transmitted over the vehicle data bus. This reduction increases the bandwidth available for other application as well as increases the perceived data transfer rate across the bus, improving the operation of not only the ADAS ECUs but any other ECU on the bus. Second, the cropping of images to only relevant portions for ADAS processing results in improved accuracy of the underlying ADAS processing routines due to the exclusion of potential objects trigger false positives during objection detection. Third, since less than a full frame is processed by the ADAS ECUs, power consumption of the ECUs is reduced and thus the operation of the entire vehicle is improved due to lowered power consumption during image processing. These, and other factors, represent significant technical improvements over existing ADASs, the details of which are described in more detail below.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
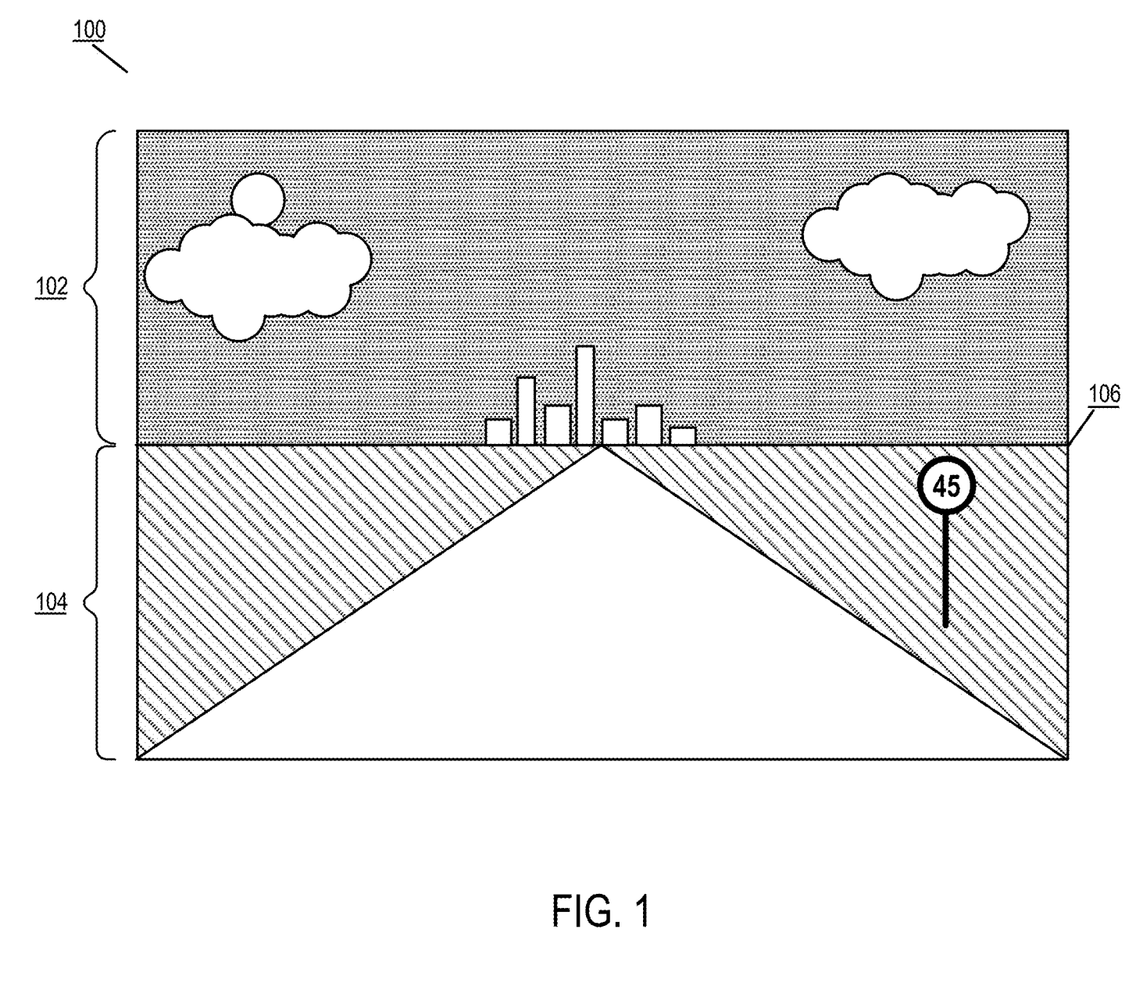
FIG. 1 is a diagram illustrating an image captured by a vehicular image sensor according to some embodiments of the disclosure.

FIG. 1 is a diagram illustrating an image captured by a vehicular image sensor according to some embodiments of the disclosure.

The illustrated embodiment includes a single frame (100) recorded by an image sensor installed on a vehicle. The frame (100) includes various features including a sky portion (102) and a land portion (104). These two portions are separated by a skyline (106).

In the illustrated embodiment, various features of the frame (100) are simplified for purposes of explanation and the disclosed embodiments are not intended to be limited to any particular type of frame. For example, the frame (100) does not illustrate other vehicles, road hazards, and various other real-world objects that would necessarily be captured in such a frame. Additionally, skyline (106) is illustrated as a horizontal line; however, in real-world embodiments, the skyline (106) may comprise a line of varying height. In the illustrated embodiment, the sky portion (102) and land portion (104) are situated adjacent along a first axis (labeled as the y-axis). Both portions (102, 104) expand across a second axis (labeled as the x-axis).

In the illustrated embodiments, an ADAS ECU primarily identifies objects appearing either partially or fully within land portion (104). For example, lane markers, other vehicles, hazards, and other objects generally appear at least partially (and more often, entirely) in land portion (104). By contrast, objects that appear in the sky portion (102) generally are not identified by ADAS systems. For example, clouds, city skylines, aircraft, birds, celestial bodies, and other airborne objects are not identified by any ADAS processing routines.

In some embodiments, existing image sensors may be used to capture a frame (100). In some embodiments, the cameras housing these image sensors are modified to pre-process the frame (100). In other embodiments, an ADAS ECU is modified to pre-process the frame (100). Thus, in some embodiments, no change is required to the underlying image sensor or its arrangement on a vehicle. In other embodiments, existing image sensors, cameras, and ADAS ECU hardware can be maintained and the firmware or software of the ECU can be updated to implement the disclosed embodiments. Each of these embodiments are described more fully in FIGS. 2A and 2B, and throughout the remainder of the disclosure.

Figure 2A:
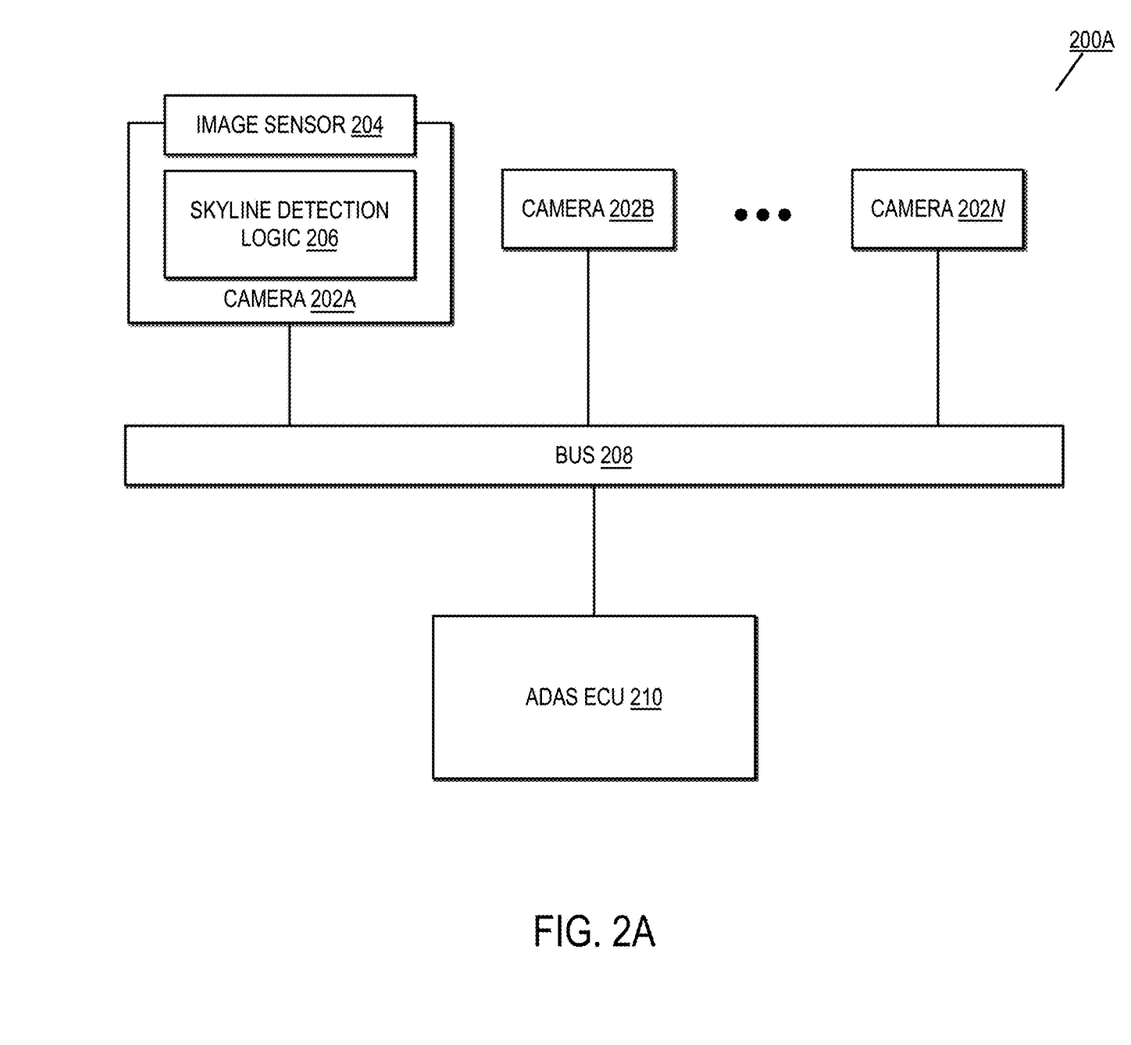
FIG. 2A is a block diagram illustrating a system for enhancing ADAS operations by reducing image frame sizes according to some embodiments of the disclosure.

FIG. 2A is a block diagram illustrating a system for enhancing ADAS operations by reducing image frame sizes according to some embodiments of the disclosure.

In the illustrated embodiment, cameras (202a, 202b, 202n; referred to collectively as 202) are installed within a vehicle system (200a). These cameras (202) are connected to an ADAS ECU (210) via a bus (208).

The illustrated ADAS ECU (210) comprises a computing device installed within an automobile. The form factor of the ECU (210) is not intended to be limiting but generally comprises processor, memory, input/output peripherals, and other standard hardware. In general, the ECU (210) receives data over the bus (208) and transmits data to other devices (including cameras and other ECUs) via the bus (208). In the illustrated embodiment, the bus (208) can comprise a controller area network (CAN) bus, FlexRay bus, Media Oriented Systems Transport (MOST) bus, or other suitable type of bus. In general, CAN busses are generally used to connect ADAS ECUs to other devices, but the disclosure is not limited to a particular type of bus.

In the illustrated embodiment, cameras (202) transmit image data to the ADAS ECU (210) over bus (208). This image data includes image frames capturing the surroundings of a vehicle. For example, a lane-assist ADAS ECU (or function thereof) receives images of the roadway surrounding the vehicle. In some embodiments, the ECU (210) receives frames from multiple cameras (202). In other embodiments, the ECU (210) receives a stream of frames from a single camera. That is, while illustrated as including multiple cameras (202), in some embodiments, the system (200a) may include only a single camera (e.g., 202a).

In the illustrated embodiment, a camera (202a) includes an image sensor (204) and skyline detection logic (206). In some embodiments, each of the cameras (202) is equipped with a corresponding sensor and skyline detection logic. In some embodiments, only a subset of the cameras (202) are equipped with such sensors and skyline detection logic.

In the illustrated embodiment, the sensor (204) can comprise any type of image sensor capable of recording a digital image of an area. In some embodiments, the image sensor (204) comprises a complementary metal-oxide semiconductor (CMOS) image sensor, although other particular types of sensors may be used. In the illustrated embodiment, the image sensor (204) captures individual frames of image data. Each of these frames are transmitted to skyline detection logic (206). In some embodiments, this transfer comprises a transfer of individual frames. In other embodiments, the transfer includes multiple frames transmitted in a batch processing mode. The specific interval used during batch transfers is not intended to be limiting. In some embodiments, a single image sensor (204) is used while in other embodiments multiple images sensors may be employed.

In one embodiment, skyline detection logic (206) comprises dedicated circuitry for performing image processing on one or more frames received from the image sensor (204). In one embodiment, skyline detection logic (206) comprises an application-specific processor or field-programmable gate array or similar application-specific device. In other embodiments, skyline detection logic (206) comprises firmware, software, or combination thereof executed by a general purpose central processing unit (CPU), graphics processing unit (GPU), or other processing element. Operations performed by skyline detection logic (206) are described in more detail throughout the description and most notably in the descriptions of FIGS. 3 through 5. In brief, skyline detection logic (206) is configured to receive a raw image frame and detect a skyline for the images captured by the image sensor (204). After performing this processing, the skyline detection logic (206) then transmits only that portion of the image frames that include a land portion (e.g., land portion 104).

In the illustrated embodiment, the ECU (210) thus receives only a subset of a given frame captured by the image sensor (204). Specifically, the skyline detection logic (206) transmits the land portion of the captured images to the ECU (210) over bus (208). In response, the ECU (210) is configured to process this land portion according to preconfigured processing routines. In the illustrated embodiment, the specific processing performed by ECU (210) is not intended to be limiting and any types of ADAS processing may be performed by the ECU (210). In response to the processing, the ECU (210) then transmits data and/or instructions to one or more other components of the system (200a) including cameras (202) and other devices (not illustrated).

Figure 2B:
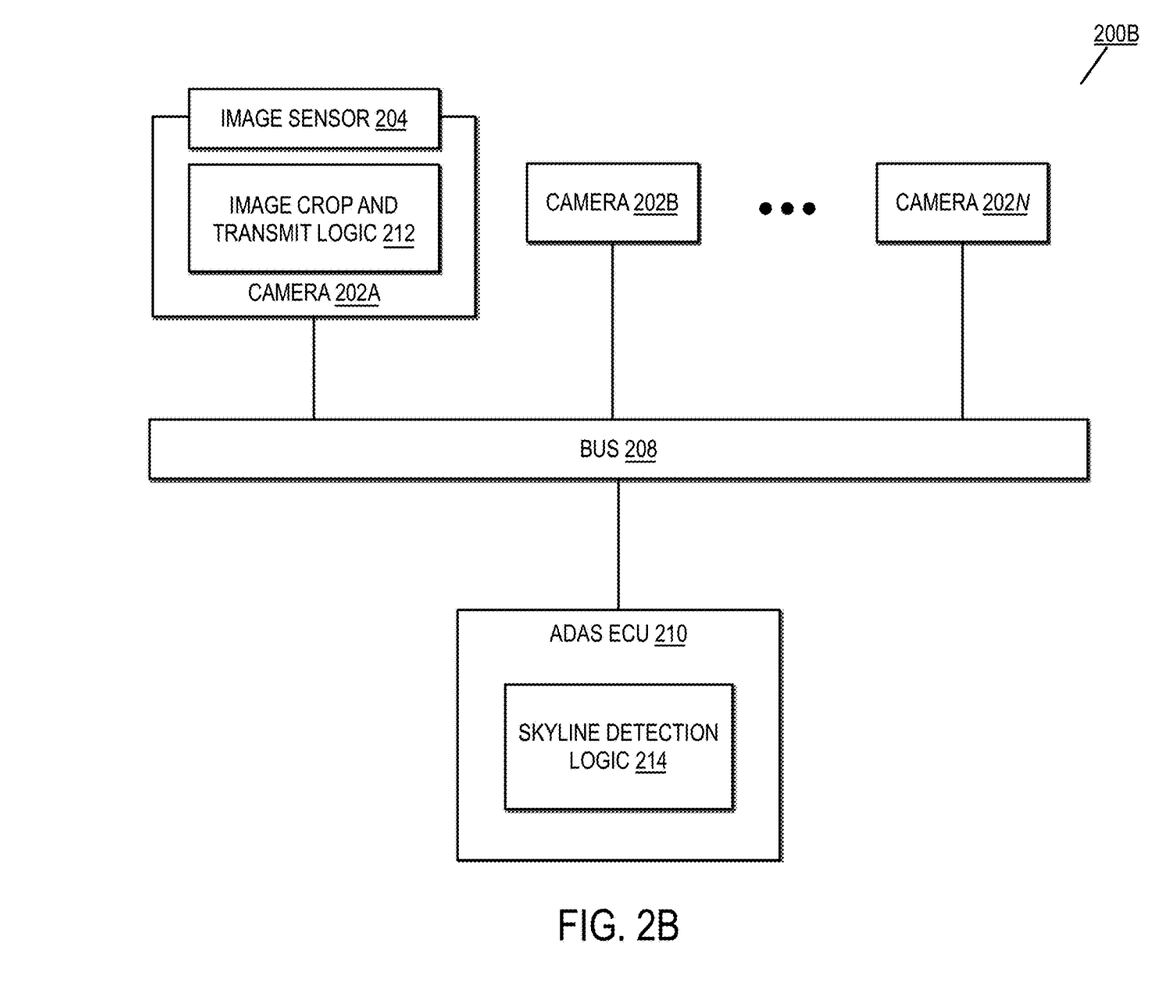
FIG. 2B is a block diagram illustrating an alternative system for enhancing ADAS operations by reducing image frame sizes according to some embodiments of the disclosure.

FIG. 2B is a block diagram illustrating an alternative system for enhancing ADAS operations by reducing image frame sizes according to some embodiments of the disclosure.

The components (202a, 202b, 202n, 208, and 210) of system (200b) were previously discussed in the description of FIG. 2A and descriptions of those components are not repeated herein for the sake of clarity.

Figure 3:
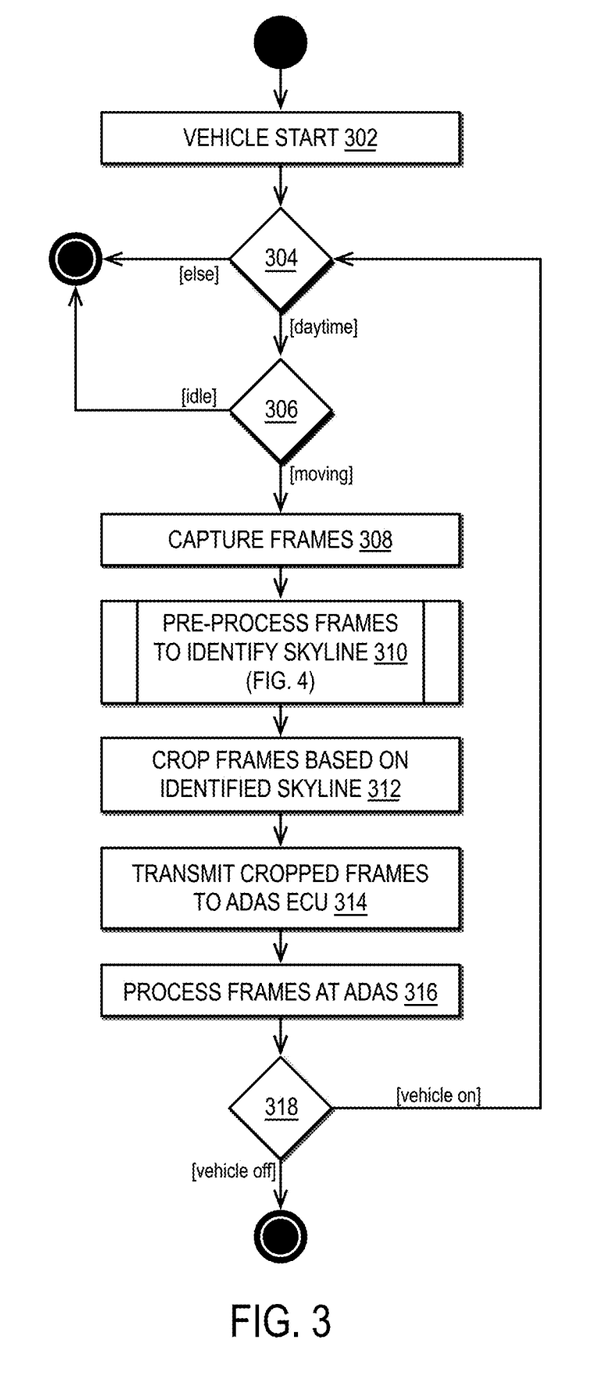
FIG. 3 is a flow diagram illustrating a method for pre-processing captured images for enhanced ADAS processing according to some embodiments of the disclosure.
Figure 4:
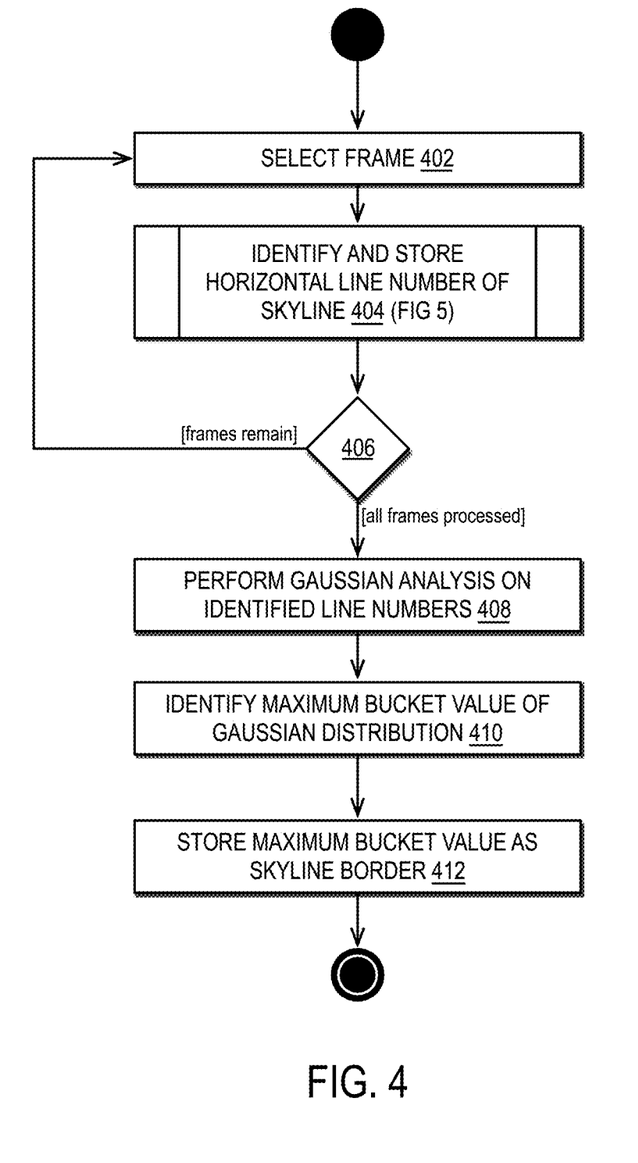
FIG. 4 is a flow diagram illustrating a method for identifying a skyline in a series of image frames according to some embodiments of the disclosure.
Figure 5:
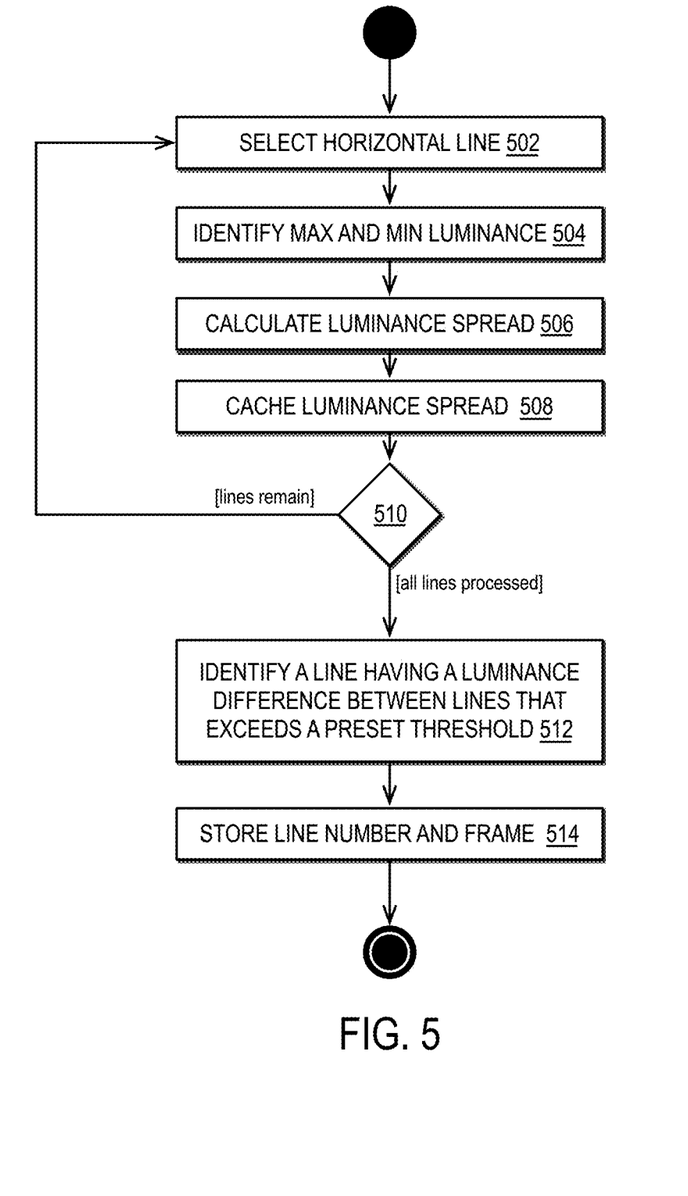
FIG. 5 is a flow diagram illustrating a method for identifying a skyline in an image frame according to some embodiments of the disclosure.

In the illustrated embodiment, the methods described in FIGS. 3 through 5 are distributed between cameras (202) and the ECU (210). Specifically, one or more of the cameras (202) are equipped with image crop and transmit logic (212). In the illustrated embodiment, the image crop and transmit logic (212) is configured to receive image frames from the image sensor (204) and crop the frames according to a horizontal position pre-configured in the camera (202a). This preconfigured horizontal position is set by the ECU (210), as described in more detail below. Thus, the processing logic of image crop and transmit logic (212) is reduced in complexity as compared to FIG. 2A. As a result, each camera (202) includes less components and reduces the total power used by the cameras. As with skyline detection logic (206), image crop and transmit logic (212) is configured to send a cropped frame to the ECU (210). Further, image crop and transmit logic (212) can comprise hardware, firmware, software or a combination thereof.

In contrast to FIG. 2A, the skyline detection logic (214) is situated within the ECU (210) and can comprise hardware, firmware, software or a combination thereof. In the illustrated embodiment, the skyline detection logic (214) is configured to identify a horizontal position or range of positions representing the skyline in image frames captured by a given image sensor (204).

In the illustrated embodiment, the skyline detection logic (214) identifies the skyline in a plurality of raw frames receives from image sensor (204). In one embodiment, camera (202a) transmits a full frame to ECU (210) if the preconfigured horizontal position of the camera (202) is not set or is not fresh. For example, upon starting up, the preconfigured horizontal position may be null. Thus, the image crop and transmit logic (212) cannot crop the image frames and instead transmits the whole frame to the ECU (210). Alternatively, or in conjunction with the foregoing, the camera (202a) may record an age of the preconfigured horizontal position and "expire" the preconfigured horizontal position after a pre-defined interval (e.g., ten minutes).

Upon expiring, the preconfigured horizontal position is set to null and full frames are again transmitted to the ECU (210).

In the illustrated embodiment, the ECU (210) is configured to first determine whether a full frame or cropped frame has been received. In one embodiment, the ECU (210) is configured with the resolutions of each camera (202). Alternatively, the ECU (210) can probe the cameras (202) for their resolutions. Then, the ECU (210) compares the resolution to the image frame dimensions to determine if the entire image frame was received or if less than the entire image frame was received.

If a cropped image frame is received, the ECU (210) processes the cropped image frame according to the processing routines employed by the ECU (210) which are not limiting. However, if the ECU (210) determines that a full image frame has been received the ECU (210) processes the image frame to identify a skyline. The ECU (210) then uses transmits the horizontal position of the identified skyline back to the camera (202a). The camera (202a) stores this horizontal position of the identified skyline as the preconfigured horizontal position and begins cropping subsequent frames. In some embodiments, while computing the skyline position, the ECU (210) may perform ADAS processing on full frames to avoid delays in ADAS processing. Alternatively, the ECU (210) may first identify a skyline, crop the frame, and then perform ADAS processing, thus simulating a cropped frame received from camera (202a). Various details of the skyline detection routines employed by skyline detection logic (214) are described in more detail in the following FIGS. 3 through 5.

FIG. 3 is a flow diagram illustrating a method for pre-processing captured images for enhanced ADAS processing according to some embodiments of the disclosure. In some embodiments, the methods discussed in the description of FIG. 3 may be performed by an ADAS ECU, dedicated camera logic, or a combination of both (as discussed above).

In block 302, a vehicle is started. In the illustrated embodiment, block 302 comprises the initialization and startup of a vehicles electronic subsystems including ECUs, input/output devices, and other computerized devices. In some embodiments, block 302 may include the startup of automotive (i.e., non-digital) components; however, this is not required.

In block 304, the method detects whether it is currently daytime. In one embodiment, daytime comprises a portion of a 24-hour day in which the sun is visible. In one embodiment, the method utilizes a current time to determine whether it is currently daytime. For example, the method can utilize a known sunset and sunrise time to determine whether the current time is between sunrise and sunset for the current day. In other embodiments, the method can utilize image recognition to determine if image frames captured by a vehicle camera includes the sun. In other embodiments, the method can analyze the luminance (or other attributes) of frames captured by the cameras to determine if the average frame luminance (or other attributes) is above a preconfigured threshold. In some embodiments, block 304 is optional. In these embodiments, the cameras may comprise infrared cameras and thus can detect the skyline during evenings.

If the method determines that vehicle was started during non-daylight hours, the method ends. In some embodiments, the method ends prematurely based on detecting the absence of daylight to avoid extraneous processing. Specifically, when using a visual spectrum camera, the detection of a skyline during nighttime hours may be difficult (or impossible). Thus, the method bypasses the skyline detection methods described herein since the results cannot be guaranteed.

Next, in block 306, the method determines if the vehicle including the components executing the method is moving or idle. In some embodiments, block 306 is optional. Specifically, in the illustrated embodiment, block 306 is implemented to prevent unnecessary image processing of frames while a vehicle is stationary. In some embodiments, the ADAS ECU processing the frames is only functional when the vehicle is in motion (e.g., lane-assist, distance detection, etc.). Thus, in block 306, the method bypasses further processing until the vehicle is in motion.

If the vehicle is in motion during daytime, the method proceeds to block 308.

In block 308, the method captures one or more frames. As discussed above, capturing frames can be performed by a camera installed in the vehicle via one or more image sensors. Generally, the image frames comprise frames of a fixed width and height, dictated by the resolution of the camera capturing the image frames. The specific form of image frames is not intended to be limiting and generally any type of frame may be captured in block 308 and subsequently processed.

In block 310, the method pre-processes the image frames to identify a skyline. This process is described more fully in FIG. 4, the disclosure of which is not repeated herein. In general, block 310 comprises identifying a horizontal position of a skyline based on the image frames captured in block 308. The horizontal position can comprise an integer representing the position along the height of the image frames where the skyline appears. Alternatively, the horizontal position can comprise a range of values (e.g., a "bucket") of positions along the height of an image frame where the skyline appears.

In some embodiments, while capturing frames in block 308, the method transmits the full frames to an ADAS ECU for processing. That is, while the method is attempting to locate a skyline, the method may also process full-frame images to avoid a gap in processing while executing block 310.

In block 312, the method crops frames based on the identified skyline. In one embodiment, the frames cropped in block 312 comprise frames received after capturing the frames in block 308. In some embodiments these frames are referred to as future image frames. In the illustrated embodiment, cropping in image comprises segmenting the image at a preconfigured horizontal position. If a given image frame has a height of h, the preconfigured horizontal position comprises value between 0 and h. In another embodiment, the height of a given image is segmented into n regions ($\{h_i | x \in N, x<n\}$). For example, a 100 pixel height can be divided into twenty buckets, each buckets comprising 5 pixels. Thus, in this embodiment $h_1$ would comprise height pixel range 0 through 4, $h_2$ would comprise height pixel range 5 through 9, and $h_n$ would comprise height pixel 96 through 100 (all inclusively). In this bucketed embodiment, the preconfigured horizontal position can comprise an identifier of one of these buckets i. In the illustrated embodiment, cropping the image may be accomplishing using existing image processing library but generally includes selecting a subset of lines appearing between the preconfigured horizontal position and the bottom line of the image frame and storing or transmitting this subset of lines as a cropped image.

In block 314, the method transmits the cropped image frames to an ADAS ECU. As described above, in block 314 a camera transmits cropped image frames to one or more ADAS ECUs over a bus such as a CAN bus. In one embodiment, the method transmits individual cropped image frames. In other embodiments, the method batch transmits a set of cropped image frames.

In block 316, the method processes the cropped frames at the corresponding ADAS ECUs. As discussed above, processing the cropped frames can comprise performing object recognition on the cropped frames according to the needs of the ADAS ECU. The specific processing performed on the cropped frames is not intended to be limiting and any type of processing performed by ADAS systems can be used in block 316.

In block 318, the method determines whether the vehicle is still operating. If so, the method continues steps 304 through 316 described above. If not, the method ends and is restarted upon detecting that the vehicle is started anew.

FIG. 4 is a flow diagram illustrating a method for identifying a skyline in a series of image frames according to some embodiments of the disclosure. In some embodiments, the methods discussed in the description of FIG. 4 may be performed by an ADAS ECU, dedicated camera logic, or a combination of both (as discussed above).

In block 402, the method selects a frame.

In one embodiment, the method receives one or more raw image frames captured by an image sensor on a vehicle as discussed previously. In one embodiment, the method receives a single frame, however in other embodiments the method receives frames in a batch, thus allowing for rapid processing of multiple consecutive frames.

In block 404, the method identifies a line number of a horizontal line corresponding to a skyline within a frame selected in block 402. This per-frame process is described in more detail in FIG. 5, and that description is not repeated herein in detail. In general, the output of block 404 is an integer value that identifies where the skyline is located (in relation to the height of an image frame). This value is computed by analyzing the luminance values of the lines of a given frame. In other embodiments, however, the horizontal line can be computed using a neural network or other machine learning model that is trained using images with known skyline points.

In block 406, the method determines if any more frames are available for processing. If so, the method re-executes blocks 402 and 404 for each remaining frame. The output of block 406 thus comprises a set of horizontal line numbers corresponding to each frame received in block 402. In some embodiments, the set of frames received in block 402 comprises a fixed number of consecutive frames. Alternatively, the set of frames received in block 402 comprises a set of frames captured during a preconfigured time interval.

In block 408, the method performs a Gaussian analysis on the identified line numbers. In one embodiment, the method segments the height of the image frames into multiple "buckets" or ranges of height values (e.g., [0 . . . 9], [10 . . . 19], . . . [n−9 . . . n]). The method then iterates through each line number and increments a counter for each bucket. The result is a Gaussian distribution. An example of such a distribution is provided below in Table 1. In Table 1, 100 image frames were processed with each image frame having a height of 100 pixels and a bucket size of ten pixels.

TABLE 1

| Bucket | Line Numbers |
|---|---|
| 0 . . . 9 | 1 |
| 10 . . . 19 | 0 |
| 20 . . . 29 | 0 |
| 30 . . . 39 | 14 |
| 40 . . . 49 | 75 |
| 50 . . . 59 | 9 |
| 60 . . . 69 | 0 |
| 70 . . . 79 | 0 |
| 80 . . . 89 | 1 |
| 90 . . . 99 | 0 |

In block 410, the method selects the maximum bucket value (also referred to as a maximum section value) using the Gaussian distribution. In one embodiment, the maximum bucket value comprises the bucket having the most line numbers.

Referring to Table 1, buckets [0 . . . 9] and [80 . . . 89] have a value of one, which indicates an outlier during processing. In contrast, 98% of the identified skylines are within the range of 30 . . . 59. Here, the maximum bucket value comprises bucket 40 . . . 49. Thus, this bucket (or range of height values) is used as the location of the skyline.

In some embodiments, there may be little variation between one or more lines. In some embodiments, the method may group buckets into a single larger bucket. For example, the following Table 2 illustrates such a scenario.

TABLE 2

| Bucket | Line Numbers |
|---|---|
| 0 . . . 9 | 1 |
| 10 . . . 19 | 0 |
| 20 . . . 29 | 0 |
| 30 . . . 39 | 49 |
| 40 . . . 49 | 49 |
| 50 . . . 59 | 0 |
| 60 . . . 69 | 0 |
| 70 . . . 79 | 0 |
| 80 . . . 89 | 1 |
| 90 . . . 99 | 0 |

Here, buckets [30 . . . 39] and [40 . . . 49] have the same number of lines identified as skylines. In one embodiments, the method may combine these values and consider a larger bucket of 30 . . . 49 as the maximum bucket value. In another embodiment, upon detecting such a tie, the method may continue to process frames to "break" the tie between buckets and select the maximum bucket value based on the next frame that breaks the tie. In other embodiments, the method may process a fixed number of additional frames and then re-analyze the buckets to determine a maximum bucket value. In some embodiments, the method may perform one or more of these operations when two or more buckets have a same maximum bucket value. Additionally, the method may perform one or more of these operations if two or more buckets have a line number value that is within a preconfigured (small) distance from one another, as illustrated in Table 3.

TABLE 3

| Bucket | Line Numbers |
|---|---|
| 0 . . . 9 | 1 |
| 10 . . . 19 | 0 |
| 20 . . . 29 | 0 |
| 30 . . . 39 | 45 |
| 40 . . . 49 | 50 |
| 50 . . . 59 | 3 |
| 60 . . . 69 | 0 |
| 70 . . . 79 | 0 |
| 80 . . . 89 | 1 |
| 90 . . . 99 | 0 |

Here, bucket [40 . . . 49] is the maximum bucket value, but bucket [30 . . . 39] is sufficiently close to bucket [40 . . . 49]. In these scenarios, the method may employ further processing as discussed above to ensure that the proper maximum bucket value is selected.

In block 412, after identifying the maximum bucket value, the method stores this maximum bucket value as the skyline border value and returns this value to the calling method (e.g., the method illustrated in FIG. 3). As described in the description of FIG. 3, the calling method then uses this maximum bucket value to crop future frames.

FIG. 5 is a flow diagram illustrating a method for identifying a skyline in an image frame according to some embodiments of the disclosure. In some embodiments, the methods discussed in the description of FIG. 5 may be performed by an ADAS ECU, dedicated camera logic, or a combination of both (as discussed above).

In block 502, the method selects a horizontal line. As illustrated, the method illustrated in FIG. 5 is executed for a given frame processed in FIGS. 3 and 4.

In block 504, the method identifies a maximum and minimum luminance value for each pixel in the horizontal line. As used herein luminance refers to the intensity of a pixel in a given line. Luminance can be identified using an image processing library. For an image of width w, the method calculates w luminance values for each pixel in a row. The method then finds the maximum value ($lum_{max}$) and minimum luminance value ($lum_{min}$) of this row.

In block 506, the method calculates a luminance spread. As used herein a luminance spread refers to the difference of the maximum luminance value and the minimum luminance value ($lum_{spread}=lum_{max}-lum_{min}$). As illustrated, the luminance spread represents the variation of a luminance of a given line and thus accounts for variations in luminance across a line of pixels.

In some embodiments, the method in blocks 504 and 506 excludes pixels within a predefined distance from the left and right sides of the horizontal line. In these embodiments, the method excludes these pixels due to potential distortions caused by the underlying image sensor. Alternatively, or in conjunction with the foregoing, the method may ignore high luminance values within a line. In general, the method attempts to remove outlying luminance values that exceed an average luminance value by a predefined threshold. Such values generally represent direct sun reflection on the image sensor and can be safely ignored during processing.

In block 508, the method caches the calculated luminance spread value for a given line. In some embodiments, the method stores a mapping for a given frame wherein the line number comprises a key and the luminance spread comprises the associated value, as illustrated in Table 4 which illustrates an image frame having a 10-pixel height.

TABLE 4

| Line No. | Luminance Spread |
| --- | --- |
| 0 | 0.05 |
| 1 | 0.04 |
| 2 | 0.02 |
| 3 | 0.01 |
| 4 | 0.02 |
| 5 | 0.15 |
| 6 | 0.15 |
| 7 | 0.12 |
| 8 | 0.11 |
| 9 | 0.13 |

In block 510, the method determines if all lines have been processed. If not, the method executes steps 502 through 510 for each remaining line until all lines have been processed.

In block 512, the method identifies a line having a luminance value between lines that exceeds a preset threshold. In some embodiments, this preset threshold is a fixed value. In other embodiments, it may comprise the largest difference.

In the illustrated embodiment, the method processes a line and the line immediately preceding the line. The method computes the difference in luminance spreads between these lines: $d(n-1, n) = \text{lum}_{spread\_n} - \text{lum}_{spread\_n-1}$. In some embodiments, the absolute value of this difference is used to identify the skyline. Examples of this calculation are provided in Table 5, which corresponds to the luminance spreads computed in Table 4:

TABLE 5

| Line No. | Luminance Spread | Difference (ABS) |
| --- | --- | --- |
| 0 | 0.05 | NaN |
| 1 | 0.04 | 0.01 |
| 2 | 0.02 | 0.02 |
| 3 | 0.01 | 0.01 |
| 4 | 0.02 | 0.01 |
| 5 | 0.15 | 0.13 |
| 6 | 0.15 | 0.00 |
| 7 | 0.12 | 0.03 |
| 8 | 0.11 | 0.01 |
| 9 | 0.13 | 0.02 |

In the illustrated embodiment, line number 6 represents the line number having the largest difference between a preceding line. As illustrated, line number zero can be skipped. In some embodiments, if the preset threshold is under 0.13, line number 6 is selected as the skyline line number. In other embodiments, line number 6 is selected due to the line having the highest difference. In some embodiments, when a fixed threshold is used, the first line satisfying the threshold (when analyzing from the top of an image to the bottom) is used as the skyline.

In general, the above method operates due to the fact that sky portions of images generally have little difference between luminance values, when compensating for sensor deficiencies and direct sunlight. Even on cloudy days, the actual luminance of each pixel is generally harmonious. In contrast, land portions experience greater fluctuations in luminance and thus result in a larger luminance spread. Thus, by finding the first line having a drastic change in luminance, the method can reliably identify when a sky portion ends and a land portion begins due to the dramatic shift in luminance spreads.

In step 514, the method stores the identified line number and associates the identified line number with the frame analyzed by the method. The method then returns this associate for further processing (e.g., as processed in FIG. 4).

Figure 6:
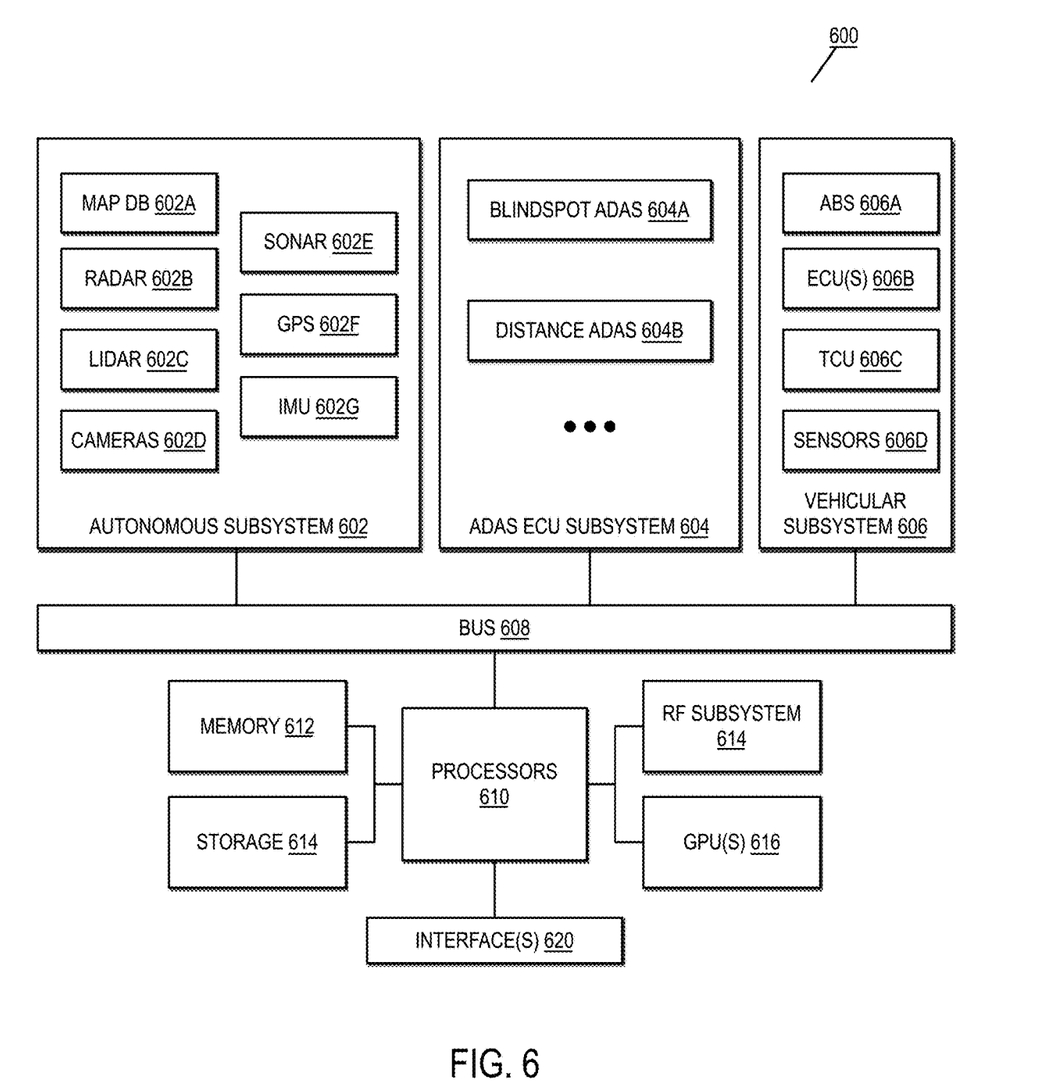
FIG. 6 is a block diagram of a vehicle according to some embodiments of the disclosure.

FIG. 6 is a block diagram of a vehicle according to some embodiments of the disclosure.

The system illustrated in FIG. 6 may be installed entirely within a vehicle. In some embodiments, some components (e.g., components and subsystems other than subsystem (604)) may comprise existing autonomous and non-autonomous vehicle subsystems.

The system optionally includes an optional autonomous vehicle subsystem (602). In the illustrated embodiment, autonomous vehicle subsystem (602) includes map database (602a), radar devices (602b), Lidar devices (602c), digital cameras (602d), sonar devices (602e), GPS receivers (602f), and inertial measurement units (602g). Each of the components of autonomous vehicle subsystem (602) comprise standard components provided in most current autonomous vehicles. In one embodiment, map database (602a) stores a plurality of high-definition three-dimensional maps used for routing and navigation. Radar devices (602b), Lidar devices (602c), digital cameras (602d), sonar devices (602e), GPS receivers (602f), and inertial measurement units (602g) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality. In some embodiments the autonomous subsystem (602) is built into the vehicle while in other embodiments the autonomous subsystem (602) comprises an aftermarket system. In the illustrated embodiment, the cameras (602d) may comprise the cameras (202) described in the descriptions of FIGS. 2A and 2B.

Vehicular subsystem (606) is additionally included within the system. Vehicular subsystem (606) includes various anti-lock braking systems (606a), engine control units (606b), and transmission control units (606c). These components may be utilized to control the operation of the vehicle in response to the data generated by autonomous vehicle subsystem (602) and/or ADAS subsystem (604). The standard autonomous vehicle interactions between autonomous vehicle subsystem (602) and vehicular subsystem (606) are generally known in the art and are not described in detail herein.

The processing side of the system includes one or more processors (610), short-term memory (612), an RF system (614), graphics processing units (GPUs) (616), long-term storage (618) and one or more interfaces (620).

The one or more processors (610) may comprise central processing units, FPGAs, or any range of processing devices needed to support the operations of the autonomous vehicle. Memory (612) comprises DRAM or other suitable volatile RAM for temporary storage of data required by processors (610). RF system (614) may comprise a cellular transceiver and/or satellite transceiver. Long-term storage (618) may comprise one or more high-capacity solid-state drives (SSDs). In general, long-term storage (618) may be utilized to store, for example, high-definition maps, routing data, and any other data requiring permanent or semi-permanent storage. GPUs (616) may comprise one more high throughput GPU devices for processing data received from autonomous vehicle subsystem (602a). Finally, interfaces (620) may comprise various display units positioned within the autonomous vehicle (e.g., an in-dash screen).

The system additionally includes an ADAS subsystem (604) which performs the operations required by the methods illustrated in the preceding Figures. The ADAS subsystem (604) includes a blind spot ADAS (604*a*) and distance ADAS (604*b*) which perform the blind spot algorithms and distance detection algorithms. The outputs of these systems control the components of vehicular subsystem (606) in the manner described. The exemplary ADAS subsystem components (604*a*, 604*b*) are not intended to be limiting and various other ADAS subsystem components may be used in lieu of, or in combination with, components (604*a*, 604*b*). Generally, any the ADAS subsystem components may comprise the ECUs described in FIGS. 2A and 2B.

Each of the devices is connected via a bus (608). In one embodiment, the bus (608) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving an image frame captured by an image sensor installed on a vehicle;
   assigning luminance values to horizontal lines of the image frame;
   identifying a position of a skyline in the image frame by calculating luminance differences between each pair of horizontal lines and identifying a luminance difference having a highest difference, the highest difference associated with at least one horizontal line comprising the position of the skyline;
   cropping one or more future image frames based on the position of the skyline to generate cropped images comprising a subset of the one or more future image frames; and
   processing the cropped images at an advanced driver-assistance system (ADAS).

2. The method of claim 1, further comprising determining that a current time corresponds to daytime and that the vehicle is in motion prior to identifying the position of the skyline in the one or more image frames.

3. The method of claim 1, wherein identifying a horizontal line number for a given image frame comprises:
   calculating a first luminance spread for a first horizontal line;
   calculating a second luminance spread for a second horizontal line, the second horizontal line located after the first horizontal line;
   calculating the difference between the second luminance spread and the first luminance spread; and
   using a number of the first horizontal line as the horizontal line number of the image frame when the difference is greater than a predetermined threshold.

4. The method of claim 3, the first or second luminance spread comprising a difference between a maximum and minimum luminance value of a respective horizontal line.

5. The method of claim 1, the receiving an image frame comprising receiving an image frame in a set of image frames over a predetermined period of time.

6. A non-transitory computer readable storage medium for tangibly storing computer program instructions capable of being executed by a computer processor, the computer program instructions defining steps of:
   receiving an image frame captured by an image sensor installed on a vehicle;
   assigning luminance values to horizontal lines of the image frame
   identifying a position of a skyline in the image frame by calculating luminance differences between each pair of horizontal lines and identifying a luminance difference having a highest difference, the highest difference associated with at least one horizontal line comprising the position of the skyline;
   cropping one or more future image frames based on the position of the skyline to generate cropped images comprising a subset of the one or more future image frames; and
   processing the cropped images at an advanced driver-assistance system (ADAS).

7. The non-transitory computer readable storage medium of claim 6, the program instructions further defining the step of determining that a current time corresponds to daytime and that the vehicle is in motion prior to identifying the position of the skyline in the one or more image frames.

8. The non-transitory computer readable storage medium of claim 6, wherein identifying a horizontal line number for a given image frame comprises:
   calculating a first luminance spread for a first horizontal line;
   calculating a second luminance spread for a second horizontal line, the second horizontal line located after the first horizontal line;
   calculating the difference between the second luminance spread and the first luminance spread; and
   using a number of the first horizontal line as the horizontal line number of the image frame when the difference is greater than a predetermined threshold.

9. The non-transitory computer readable storage medium of claim 8, the first or second luminance spread comprising a difference between a maximum and minimum luminance value of a respective horizontal line.

10. The non-transitory computer readable storage medium of claim 6, the receiving the image frame comprising receiving the image frame in a set of image frames over a predetermined period of time.

11. A device comprising:
    a processor; and
    a storage medium for tangibly storing thereon program logic for execution by the processor, the stored program logic causing the processor to perform operations of:
      receiving one or more image frames captured by an image sensor installed on a vehicle,
      identifying a position of a skyline in the one or more image frames by calculating luminance differences between each pair of horizontal lines and identifying a luminance difference having a highest difference, the highest difference associated with at least one horizontal line comprising the position of the skyline, cropping one or more future image frames based on the position of the skyline to generate generating cropped images comprising a subset of the one or more future image frames, and processing the cropped images at an advanced driver-assistance system (ADAS).

12. The device of claim 11, the stored program logic further causing the processor to perform the operation of determining that a current time corresponds to daytime and that the vehicle is in motion prior to identifying the position of the skyline in the one or more image frames.

13. The device of claim 11, wherein identifying a horizontal line number for a given image frame comprises:

calculating a first luminance spread for a first horizontal line;

calculating a second luminance spread for a second horizontal line, the second horizontal line located after the first horizontal line;

calculating the difference between the second luminance spread and the first luminance spread; and using a number of the first horizontal line as the horizontal line number of the image frame when the difference is greater than a predetermined threshold.

14. The device of claim 13, the first or second luminance spread comprising a difference between a maximum and minimum luminance value of a respective horizontal line.

* * * * *